Figure 2:
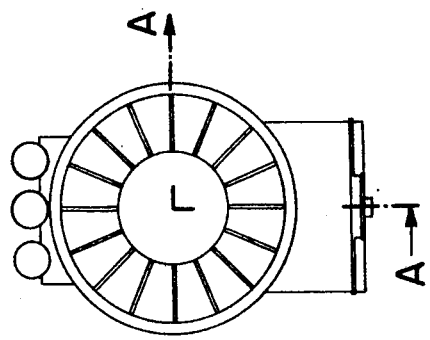

United States Patent [19]

Jäger et al.

[11] 4,029,978
[45] June 14, 1977

[54] POWER TERMINAL STRUCTURE FOR STATOR COMPONENT OF HIGH-OUTPUT TURBO-GENERATOR

[75] Inventors: Kurt Jäger; Eugen Kunz; Josko Vlah, all of Mannheim, Germany

[73] Assignee: BBC Brown Boveri & Company Limited, Baden, Switzerland

[22] Filed: June 20, 1975

[21] Appl. No.: 588,624

[30] Foreign Application Priority Data

July 3, 1974 Germany .......................... 2431958

[52] U.S. Cl. .................................. 310/64; 310/71; 336/105
[51] Int. Cl.² ........................................ H02K 9/00
[58] Field of Search ................. 310/52, 54, 53, 55, 310/56, 57, 58, 64, 65, 71, 66, 85, 176, 171, 166, 182; 336/105; 290/52; 165/185

[56] References Cited

UNITED STATES PATENTS

| | | | |
|---|---|---|---|
| 2,650,994 | 9/1953 | Bahn | 310/57 |
| 2,683,227 | 7/1954 | Beckwith | 310/64 |
| 2,728,002 | 12/1955 | Turner | 310/71 |
| 2,742,582 | 4/1956 | Bahn | 310/71 |
| 2,742,583 | 4/1956 | Beckwith | 310/64 |
| 2,828,428 | 3/1958 | Baudry | 310/64 |
| 3,030,530 | 4/1962 | Tudge | 310/64 |
| 3,075,104 | 1/1963 | Willyoung | 310/64 |
| 3,896,320 | 7/1975 | Moffatt | 310/64 |
| 3,903,441 | 9/1975 | Towne | 310/71 |

*Primary Examiner*—R. Skudy
*Attorney, Agent, or Firm*—Pierce, Scheffler & Parker

[57] ABSTRACT

A stator conductor terminal assembly is located in a casing attached to the underside of the housing of a three-phase turbogenerator for leading out the phase windings of the stator coil heads. The assembly includes three liquid-cooled hollow conductors connected respectively at one end to corresponding hollow switching leads, the conductors extending from the switching leads in a first section vertically downward, thence in a second section directed horizontally for different distances, and then vertically downward in a third section through an elastic support carried by an insulating plate. The third sections of the hollow conductors pass outward through the bottom of the casing and terminate in polygon-shaped connection terminals. The casing also includes current transformers located below the insulating plate between the third sections of the hollow conductors. A somewhat similar arrangement of liquid-cooled hollow conductors is provided within the casing to establish the star-point terminal of the stator winding.

9 Claims, 9 Drawing Figures

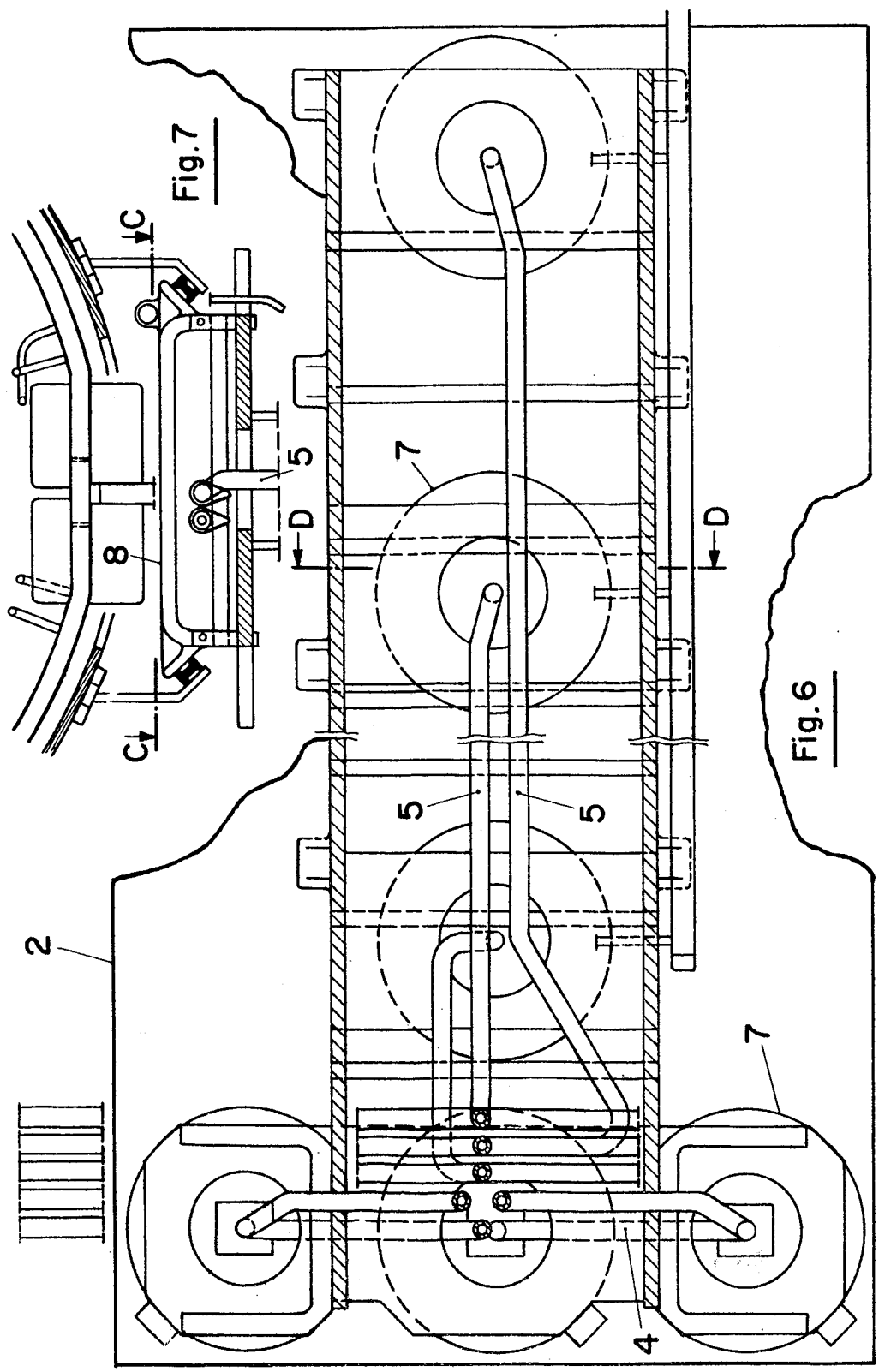

POWER TERMINAL STRUCTURE FOR STATOR COMPONENT OF HIGH-OUTPUT TURBO-GENERATOR

This invention concerns an arrangement of the stator power terminals for a high-output turbogenerator, its housing filled with a non-combustible and non-oxidizing gas which is at a slight excess pressure relative to the atmosphere, and its conductors within the rotor and the stator cooled by means of a fluid.

The housing of known high-output turbogenerators (for example 500 MW and up) is normally placed at a certain excess pressure relative to the atmosphere, with the generator lines connected to a terminal box and lead away from the housing of the terminal box by means of lead-through bushings. The terminal boxes as well as the lead-throughs are gas-tight and pressure-proof. Within the terminal box and between the winding connections and the lead-through there are arranged flexible, current-carrying components. These flexible parts are provided for the absorption of the stator conductor bar expansions in axial direction relative to the housing and have dimensions of rather substantial magnitude. The terminal boxes, for example in the shape of a body of rotation where six terminals are placed around a circle, spaced at equal distances, possess quite substantial dimensions. Therefore the space requirements for the star point, the current transformers and the lead-throughs of the terminal box housing as well as for the lines leading to the junction points of the machine transformer are very substantial, thus increasing the costs of the foundation as well as the housing of the machine.

Another known arrangement of the stator power terminals of a turbogenerator uses a flat-bottom terminal box which is provided with bores to accommodate high-tension lead-throughs and which is attached to the machine housing that is filled with gas for cooling purposes (published German application No. 1,003,344). The insulators are designed in the form of hollow bodies to accommodate tubular electric conductors, to which are connected by means of an elbow tubular lines connecting the switching leads at the coil heads. However, this arrangement again is very voluminous and thus costly, and requires the use of at least six, relatively expensive, high-tension lead-throughs.

Finally, there is known an arrangement where the generator leads are extended directly from the machine housing by means of conductors which are insulated, at least so far as the phase voltage is concerned, to be used for turbogenerators of medium output and medium voltage, and where the housing is not under excess pressure (book by Wiedemann/Kellenberger, "Konstruktion electrischer Maschinen", published 1967 by Springer, page 163, FIG. 51a).

The principal object of the invention is to reduce the constructional volume of the connecting generator leads, and in particular to eliminate the relatively costly flexible components within the connecting train of the leads as well as the large lead-throughs, in order to reduce significantly the spatial dimensions of the terminal box.

The invention solves this problem in the case of the above described arrangement by utilizing a combination of features, partially known per se, as listed below:

a. the leads which are designed in the form of hollow conductors with liquid cooling and which are insulated throughout their entire length against the full machine voltage are connected by means of coupling pieces to the switching leads which are placed at one side of the machine concentrically to the coil head and which are likewise designed in the form of hollow conductors.

b. the hollow conductors leading to the generator terminals extend first vertically to the machine axis, are then bent by 90° to run below the housing, substantially parallel to the machine axis between one metallic plate which is connected to the machine housing by means of elastic components, and one plate consisting of insulating material and fastened to the metallic plate.

c. the hollow conductors are again bent downwardly by 90° in each case at intervals which correspond in magnitude to the distances of the connecting lines between generator and transformer, run through openings within the insulating plate, being held in place by additional elastic components, then continue through bores within a casing, being supported there by gas-tight and elastic structural members, and ending in polygon-shaped terminals to which are connected the lines leading to the transformer.

This specific arrangement will result in dimensions which are substantially smaller than the dimensions of known arrangements due to the absence of the flexible intermediate parts, the high-tension lead-throughs made of porcelain, and due to the compact design of the star point. Since the hollow conductor leads are thoroughly insulated, since flexible structural components are used to hold the hollow conductor leads in place at the insulating plate, and since the metallic plate is resiliently mounted at the housing and elastic components secure the lead-through at the casing, the coil heads and their leads are able to move freely when subjected to thermal influences without generating any forces which could lead to stresses of the coil head and the conductors within the slot. This arrangement makes it thus possible to eliminate the insulators for the lead-through at the terminal box housing, a system which is not only voluminous but also costly. Since the machine is under slight excess pressure only and is filled with a non-combustible gas, the requirements for a gas-tight design will be much less demanding than in the case of known machines.

One specific species of the machine utilizes current transformers, arranged concentrically to the connecting leads under the plate consisting of insulating material and fastened to said plate.

In a further development of the invention there is an arrangement provided where the ends of the hollow conductors dip into a hollow cylinder of greater diameter which is closed at its bottom side and is connected electrically and liquid-proof at its top side with the hollow conductor and which is further provided with bores to which is connected a tube for the cooling liquid, leading to a cooling medium collecting duct which extends parallel to the machine axis. The cooling medium will thus flow through, and cool the entire length of the generator lead. In the case of another species and feature of the invention the hollow conductors which are not bent are also electrically connected at their ends by a liquid-cooled hollow conductor forming the star point, these hollow conductors likewise being connected with the cooling medium collecting duct by means of tubes.

In a further development of the invention, the fastening of the horizontally extending sections of the hollow conductors is accomplished by bolts which extend laterally to the machine axis and which are fastened to the metallic plate by means of straps.

Another advantageous feature of the invention is the arrangement of bent sides at the metallic plate to facilitate the fastening of the insulating plate.

Finally, another feature of the invention provides the supply of cooling liquid to the hollow conductors by way of the switching leads at the coil head by placing between each switching lead and its connection an L- or T-shaped intermediate piece containing a correspondingly shaped hollow space.

Figure 1:
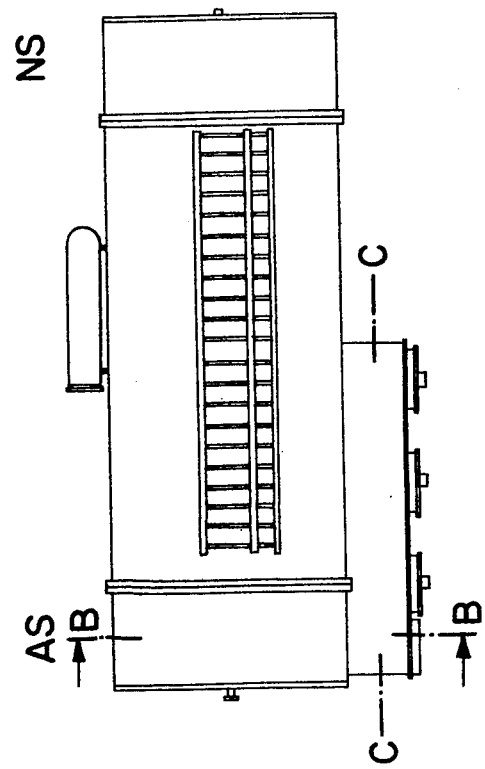
Figure 3:
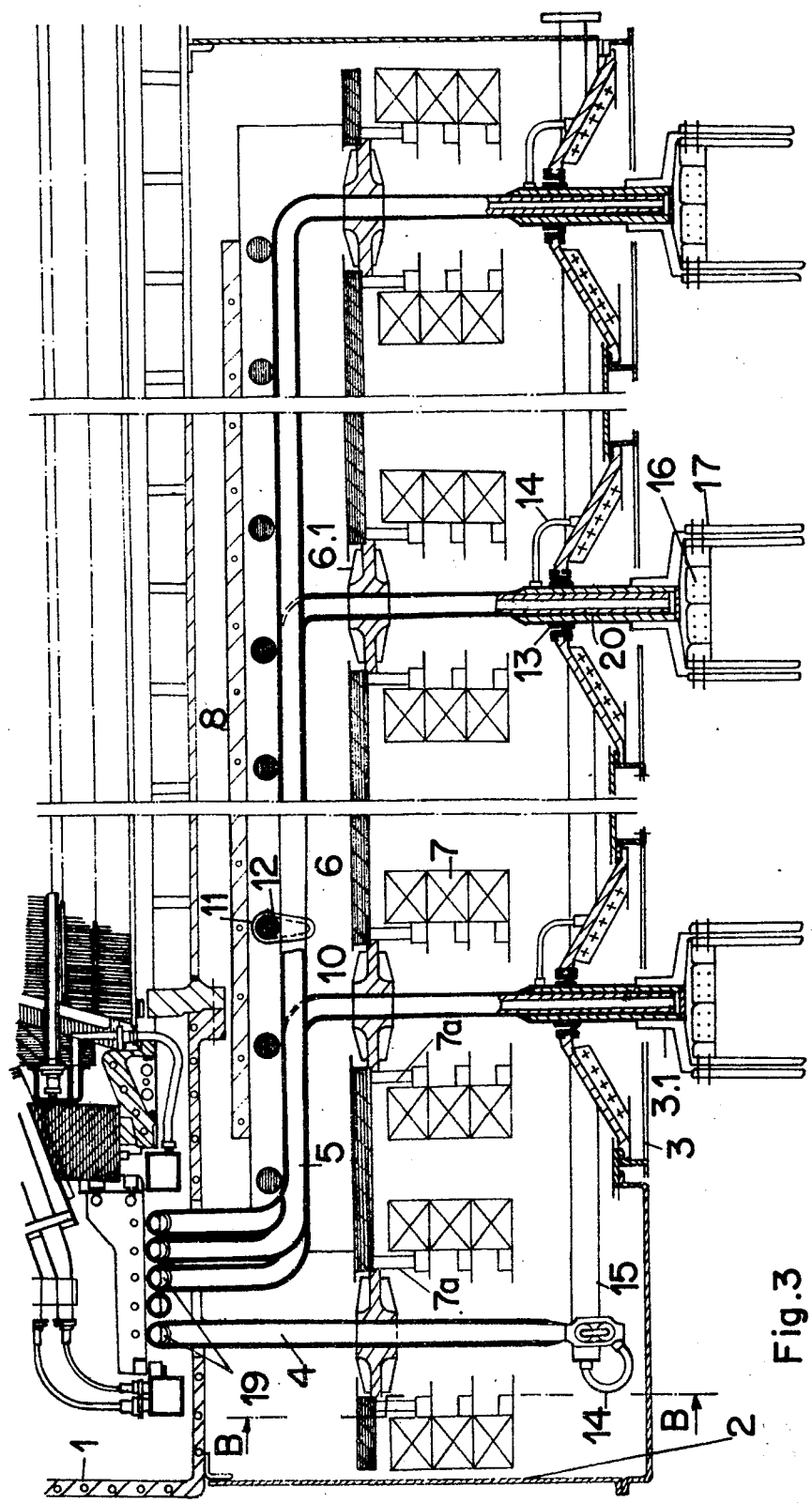
Figure 4:
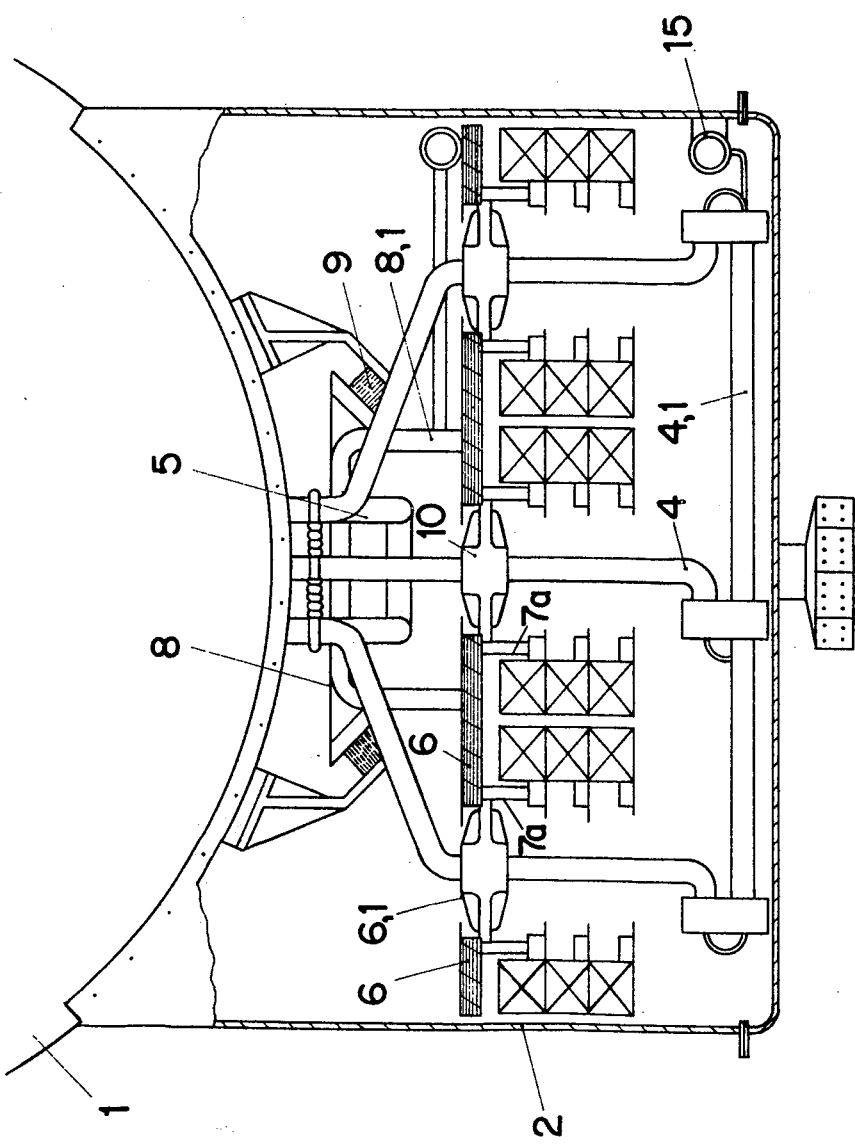
Figure 5:
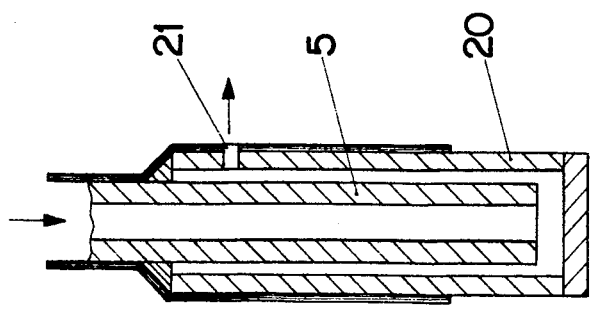
Figure 8:
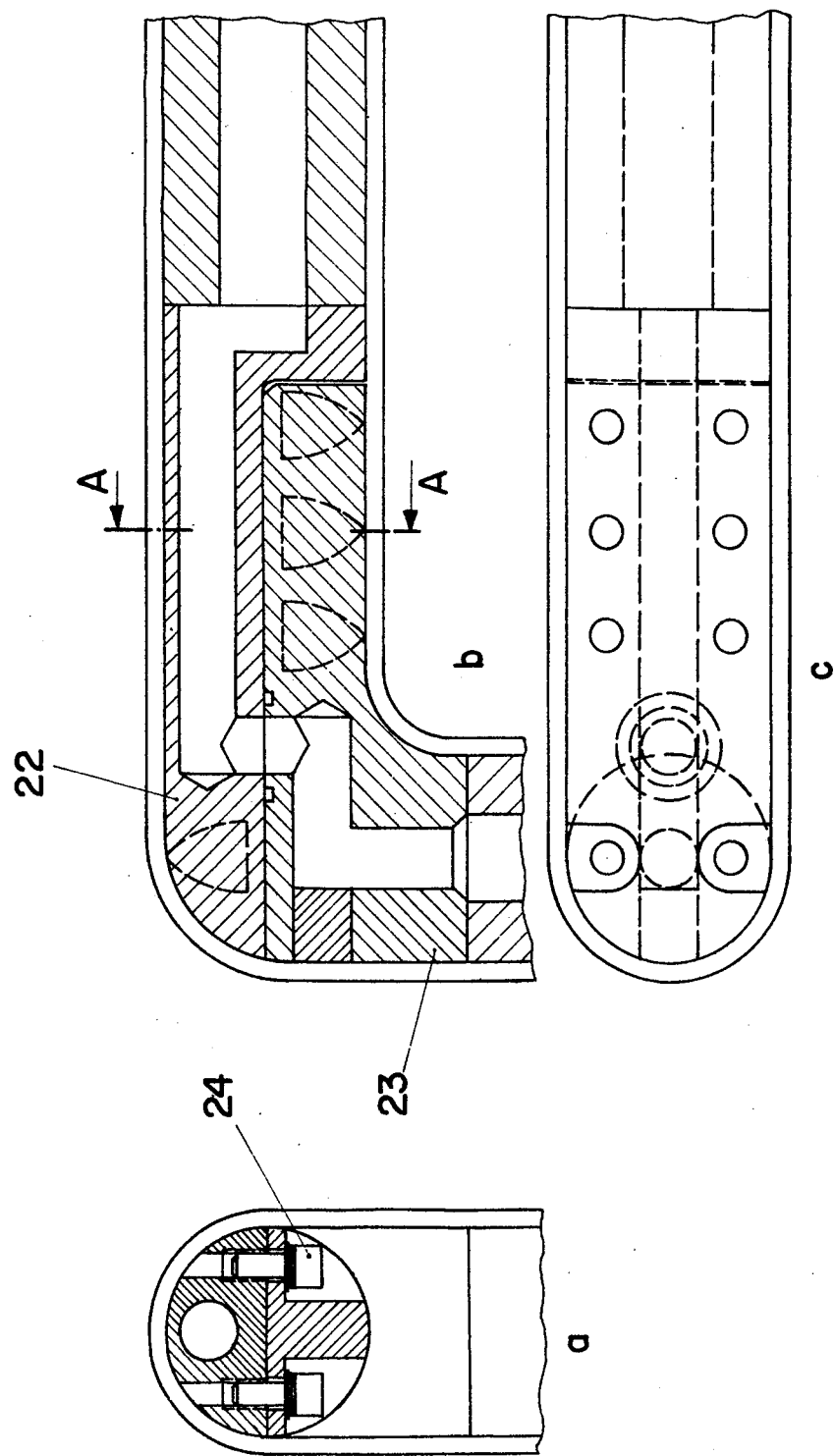

Additional details and advantageous further developments of the invention are described below by use of examples which are also illustrated by drawings wherein:

FIG. 1 shows a side view of a turbogenerator with an arrangement as proposed by the invention, FIG. 2 illustrates a front side view, FIG. 3 shows a longitudinal cross-section along line A — A of FIG. 2, depicting the connecting leads with adjacent portions of the housing, FIG. 4 shows a cross-section of the machine along line B — B of FIG. 1, FIG. 5 gives a sectional view of the end portion of a hollow lead conductor, FIG. 6 shows a horizontal cut through the terminal box along line C — C of FIG. 1, FIG. 7 shows a vertical cut through the terminal box illustrated by FIG. 6 along the line D — D, FIG. 8a shows a cross-section of one connection point between a switching lead and a hollow conductor by means of an L-shaped intermediate piece, FIG. 8b shows a longitudinal cut through said connection point.

FIG. 8c gives a bottom view of the connection point as shown by FIG. 8b, and

Figure 9:
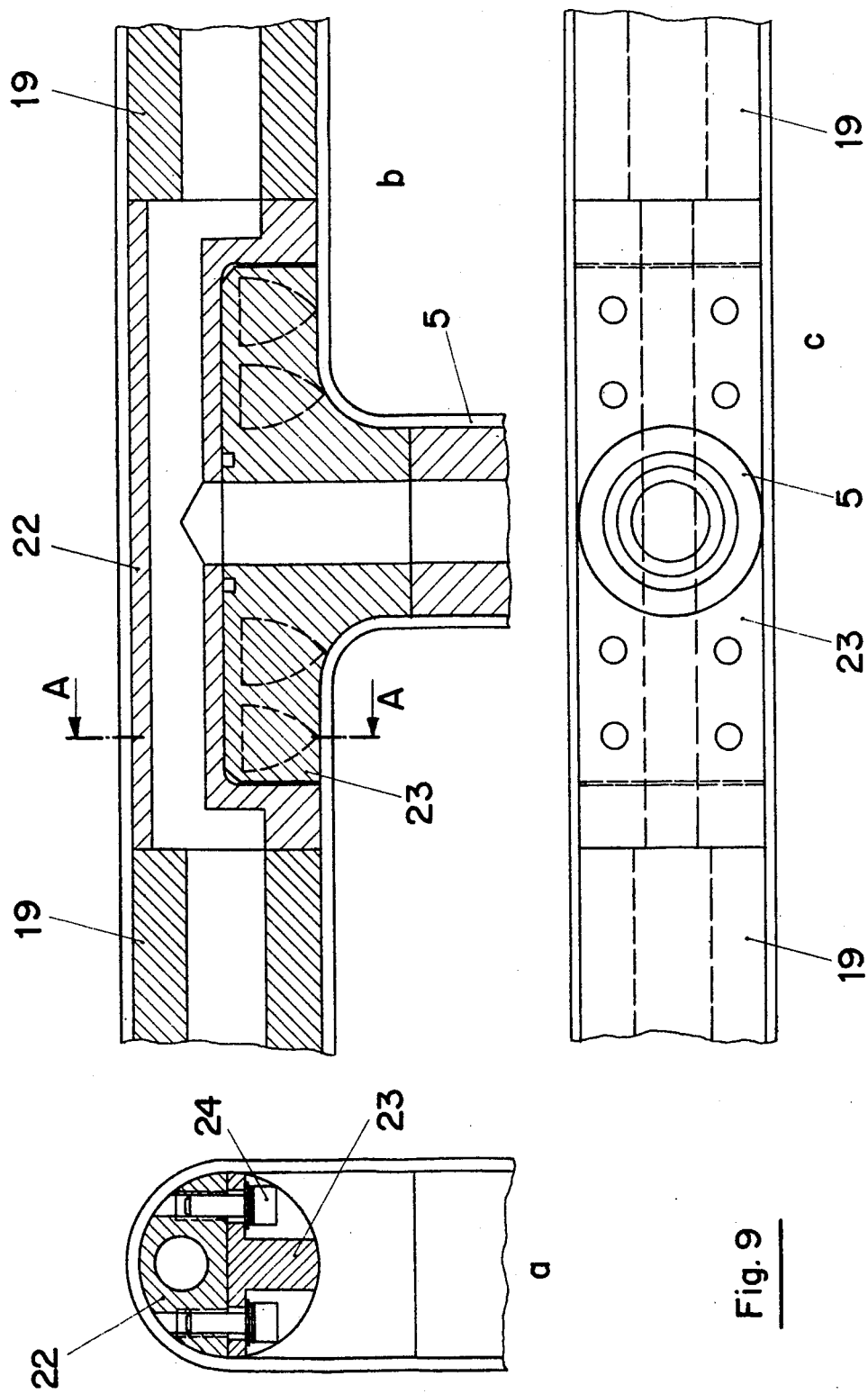

FIGS. 9a, 9b and 9c illustrate connection points in the manner shown by FIGS. 8a and 8c, but by means of a T-shaped intermediate piece.

In these drawings numeral 1 denotes the machine housing, numeral 2 a casing which is attached to the bottom side of the machine housing and which is provided with bores 3.1, the bores being closed off by covers 3. Numerals 4 and 5 denote hollow conductors which serve as connecting leads, and 4.1 identifies those hollow conductors which form the star point and connect the hollow conductors 4. The star point hollow conductor 4.1 runs in horizontal direction, transversely to the longitudinal machine axis. The center hollow conductor 4, between star point hollow conductor and switch leads, runs in vertical direction directly to the neutral terminal, while the two outer hollow conductors 4 are bent and offset twice to obtain the horizontal separation necessary for the three current transformers 7 which are arranged side-by-side along a line extending transversely to the longitudinal machine axis (see FIGS. 4 and 6).

The connections, or hollow conductors respectively, leading to the terminals which are arranged side-by-side and parallel to the longitudinal machine axis, are denoted by numeral 5. They are bent twice at right angles as shown in FIG. 3. i.e. first from a vertically downward into a horizontal direction and thence vertically downward again to provide longitudinally offset portions. The hollow conductors 5 extend between a plate 6, made of insulating material, and a metallic plate 8 which is fastened to the bottom side of the machine housing by means of elastic structural components 9 as shown in FIGS. 4 and 7. For the lead-through of the hollow conductors 5, 4 respectively, there are provided within the plate 6, made of insulating material, openings 6.1 in which the hollow conductors 5 and 4 are secured by means of elastic structural components 10.

The fastening of the hollow conductors 5 is accomplished by means of bolts, 11, affixed to the metallic plate 8 and by use of straps 12. To facilitate the fastening of the insulating plate 6, the sides of the metallic plate 8 are bent, so that its profile is U-shaped, its sides, to which the plate 6 is bolted, being identified by numeral 8.1 in FIG. 4.

To the plate 6, made of insulating material, there are further fastened by means of support 7a six current transformers 7, their primary windings formed by the hollow conductors 4, or 5 respectively. In conformity with the position of the hollow conductors 4 and 5 there are arranged three current transformers side-by-side in the direction of the longitudinal machine axis, and three current transformers are arranged transverely to the longitudinal machine axis.

The bottom portion of casing 2 is provided, as already mentioned, with longitudinally spaced openings 3.1 which are closed off by a cover 3, this cover also being provided with a bore (see FIG. 3). The lower ends of the hollow conductors 5 pass downwardly through the bores of the covers 3, and are supported at the bottom part of the casing by means of gastight and elastic structural components 13; at this bottom part there is also fastened the, not illustrated, tubular encasement of the connecting lines 17.

The hollow conductors 5 end in polygon-shaped terminals 16 to which are connected the lines 17 leading to the transformer. The ends of the hollow conductors 5 enter and terminate within a hollow cylinder 20 of greater diameter which is closed off at its bottom and which is connected at its top electrically and liquid-tight with the hollow conductor 5. Each hollow cylinder 20 each is fitted into a bore in the corresponding polygon-shaped terminal 16. The hollow cylinders 20 are provided with bores 21 to which are connected tubes 14 to carry the cooling liquid to the cooling medium collecting duct 15 which extends parallel to the machine axis. The conductor 4.1, connecting the star point, is likewise in communication with the cooling medium collecting duct 15 by way of tubes 14.

The hollow conductors 4 and 5 are connected to the switching leads by means of two-part intermediate pieces 22, 23 in the form of an L or T. Such L-shaped elbow is illustrated in FIGS. 8a, 8b and 8c in cross- as well as longitudinal section and in a bottom view, and a T-shaped piece is illustrated in FIGS. 9a, 9b and 9c. The two-part intermediate piece 22, 23 is connected to the ends of the two hollow conductors 5, or 19 respectively, by hard soldering. The two-part design of the elbow permits, upon removal of the connecting screws 24, the separation of the vertically running portion of the hollow conductor 5 into one upper component 22, provided with one horizontal and one vertical bore, and another component 23 which is attached to the vertically running hollow conductor and which is provided with two vertical bores in addition to one horizontal bore. This specific design of the elbow 22, 23 simplifies assembly and disassembly of the hollow conductors 5 at the switching leads 19.

What is claimed is:

1. The combination with a high-output three-phase turbo-generator the housing of which is filled with a non-combustible and non-oxidizing gas at a pressure level slightly exceeding atmospheric and wherein the rotor conductors and the stator conductors are cooled by circulation of a liquid coolant, of a stator conductor terminal assembly for electrically leading out the phase windings from the coil heads, said conductor terminal assembly comprising a casing secured to the underside of and extending longitudinally of the generator housing, and communicating with the interior of said housing at hollow switching leads connected to the phase windings, a metallic plate located within said casing and extending longitudinally thereof, elastic means securing said metallic plate in place within said casing, a plate of insulating material likewise located within said casing and extending longitudinally thereof in parallel spaced relation with said metallic plate, three hollow terminal conductors insulated throughout their entire length against the full voltage of the stator windings, said conductors being connected respectively at one end thereof to corresponding switching leads and which extend from the latter in a first section directed vertically downward thence in a second section directed horizontally for different distances through the space between said metallic and insulating plates and thence in a third section directed vertically downward through elastic supports therefor secured to said insulating plate, means securing the horizontally extending second sections of said hollow conductors to said metallic plate, said third vertically downward extending sections of said hollow conductors ending in polygon-shaped connection terminals and being passed through openings provided in the bottom wall of said casing, and secured in place by means of gas-tight elastic support members attached to the wall of the casing, a fluid coolant duct located within said casing, and means connecting the interior of said hollow conductors with said fluid coolant duct.

2. A stator conductor terminal assembly for a three phase generator as defined in claim 1 wherein each of said downwardly directed third sections of said hollow conductors passes through a current transformer winding secured in place at the underside of said insulating plate.

3. A stator conductor terminal assembly for a three phase generator as defined in claim 1 wherein said means for securing said second horizontally directed sections of said hollow conductors to said metallic plate comprise bolts secured to said metallic plate and straps interconnecting said bolts with said second sections of said hollow conductors.

4. A stator conductor terminal assembly for a three phase generator as defined in claim 1 wherein said third downwardly directed sections of said hollow conductors end respectively within hollow closed cylinders secured to said polygon-shaped terminals, each of said cylinders is provided with a bore through the wall thereof leading to the interior of said hollow conductor, and a tube interconnecting said bore with said coolant medium duct.

5. A stator conductor terminal assembly for a three phase generator as defined in claim 1 and which includes a hollow L-shaped connecting piece interposed between one of said switching leads and a corresponding first section of one of said hollow conductors.

6. A stator conductor terminal assembly for a three phase generator as defined in claim 1 and which includes a hollow T-shaped connecting piece interposed respectively between said switching leads and a first section of one of said hollow conductors.

7. A stator conductor terminal assembly as defined in claim 1 wherein said metallic plate includes down-turned sides to which said insulating plate is attached.

8. A stator conductor terminal assembly as defined in claim 1 and which further includes three additional hollow conductors connected to said switching leads and which likewise extend in a downward direction through elastic supports therefor secured to said insulating plate, said elastic supports being located in spaced relation in a direction transversely of the generator housing, and said additional hollow conductors being connected to a further additional hollow conductor which electrically interconnects all of said three additional hollow conductors to establish the star-point terminal of said stator winding, all of said additional hollow conductors being provided with a fluid coolant connection to said fluid coolant duct.

9. A stator conductor terminal assembly as defined in claim 8 and wherein said three additional hollow conductors pass respectively through current transformer windings secured to the under side of said insulating plate.

* * * * *